United States Patent [19]

Racicot et al.

[11] Patent Number: 4,829,318

[45] Date of Patent: May 9, 1989

[54] HEAD TENDING SYSTEM FOR PURGING AND CLEANING AN INK JET PRINT HEAD

[75] Inventors: Dale F. Racicot, Weare; Dirk P. Ten Broeck, Milford; Robert C. Aviles, Merrimack, all of N.H.

[73] Assignee: Dataproducts, Inc., Woodland Hills, Calif.

[21] Appl. No.: 103,166

[22] Filed: Sep. 30, 1987

[51] Int. Cl.[4] .......................... G01D 9/00; G01D 15/16

[52] U.S. Cl. .................................. 346/1.1; 346/140 R

[58] Field of Search ............. 346/140 PD, 140 R, 1.1, 346/75

[56] References Cited

U.S. PATENT DOCUMENTS

| | | | |
|---|---|---|---|
| 4,144,537 | 3/1979 | Kimura | 346/140 PD |
| 4,187,511 | 2/1980 | Robinson | 346/75 |
| 4,223,322 | 9/1980 | van Raamsdonk | 346/140 PD |
| 4,369,456 | 1/1983 | Cruz-Uribe et al. | 346/140 PD |
| 4,432,004 | 2/1984 | Glattli | 346/75 |
| 4,450,456 | 5/1984 | Jekel et al. | 346/140 PD |
| 4,540,997 | 9/1985 | Biggs et al. | 346/1.1 |
| 4,567,494 | 1/1986 | Taylor | 346/140 PD |
| 4,571,601 | 2/1986 | Teshima | 346/140 PD |
| 4,579,468 | 4/1986 | Gomi et al. | 400/124 |
| 4,600,928 | 7/1986 | Braun et al. | 346/75 |
| 4,600,931 | 7/1986 | Terasawa | 346/140 PD |
| 4,624,593 | 11/1986 | Humphries et al. | 400/702 |
| 4,658,274 | 4/1987 | De Young | 346/140 PD |
| 4,668,965 | 5/1987 | Tanaka et al. | 346/140 PD |

OTHER PUBLICATIONS

O. Sequill Print Head Re-priming System Drug, No. 284,117, Nov. 1, 1985, Data Products Corp.

*Primary Examiner*—E. A. Goldberg
*Assistant Examiner*—Mark Reinhart
*Attorney, Agent, or Firm*—Spensley Horn Jubas & Lubitz

[57] ABSTRACT

A head tending system for purging and cleaning an ink jet print head includes a self-aligning purge nozzle which can float into positive engagement with a vent hole of the print head and a wiping roller of a non-circular contour about which a tape of wiping cloth passes.

23 Claims, 6 Drawing Sheets

HEAD TENDING SYSTEM FOR PURGING AND CLEANING AN INK JET PRINT HEAD

BACKGROUND OF THE INVENTION

1. Field of the Invention

The disclosed invention relates generally to the problem of maintaining an ink jet print head in a desired operating condition. More specifically, it relates to the problem of purging and cleaning a print head which utilizes a solid ink that melts into liquid form when heated.

2. Description of the Prior Art

U.S. Pat. No. 4,658,274, issued to De Young, Apr. 14, 1987, describes a hot melt type of ink jet printer in which a print head is heated during operation in order to maintain a hot melt ink in a liquid phase. The liquefied state has to be maintained during periods when the ink is to be hydro-mechanically ejected as a plurality of melted droplets from tiny orifices.

Known solid inks tend to degrade over time when held at liquid temperatures. It consistent print quality is desired, an unused volume of ink which has been held in a heated state for too long should be replaced with a fresh volume ink.

FIG. 1 is a partial top view of a previous printer 10 having a frame 10*a* and including a purging system such as proposed in U.S. Pat. No. 4,658,274 to DeYoung. The printer 10 includes a movable print head 11 which is reciprocably supported on a pair of guide rails 12. The guide rails are fastened to the frame 10*a*. The head 11 is controlled to move back and forth along the rails from a printing area 14 in the printer to a head maintenance area 16. A rigid V-tipped tube 22 is provided within the maintenance area 16 for engagement with a vent hole 11*a* of the print head 11. An air pump 20 supplies pressurized air through a flexible line 21 to the V-tipped rigid tube 22. The V-tipped tube 22 is reciprocally disposed in a bushing 24 that is fastened to the frame 10*a* as shown.

When the print head 11 is to be purged, the print head is moved to bring the vent hole 11*a* of the print head into engagement with the V-tipped tube 22. The air pump 20 is then activated to pump air through the vent hole 11*a* into the interior of the print head. The level of air pressure at the vent hole 11*a*, relative to the ambient air pressure, controls the rate at which melted ink 15*b* within the print head moves up a capillary tube 17 to be expelled from one or more orifices 18 (only one shown) passing through a printing face 11*d* of the print head 11. The melted ink 15*b* is usually held within the print head in a reservoir 11*b*. The temperature of the reservoir is controlled by a heater 11*c*. A solid ink cartridge 15, containing pellets 15*a* of solid ink, supplies fresh ink material to the reservoir 11*b* whenever the liquid ink 15*b* in the reservoir drops below a predetermined level.

During a normal printing mode, the vent hole 11*a* is left open so that the air pressure inside the print head 11 is approximately the same as the air pressure outside the print head. A plurality of piezoelectric transducers 19 (one shown) are used to fire ink droplets 15*c* from the plural orifices 18 (one shown) the print head to a spaced away page of paper 19 held on a platen 10*c*. The platen 10*c* is fastened elsewhere to the printer frame 10*a*. The paper 19 is preferably spaced by a precise distance CC away from the printing face 11*d* of the print head to assure good print quality.

When ink jet printers of the type shown in FIG. 1 are mass produced, a phenomenon known as "tolerance build-up" can occur. A substantial misalignment can develop between the V-tipped tube 22 and the vent hole 11*a* even though the bushing 24 is positioned within a prespecified tolerance relative to the printer frame 10*a*, the carriage rails 12 are also attached within a set tolerance relative to the frame, and the print head 11 is held within a specified tolerance relative to the carriage rails 12. Positional deviations, DD, can add up between the respective axes, AA, BB, of the tube and vent hole such that the V-tipped tube 22 will not properly align with the vent hole 11*a* of the print head. The pressure level during a purge operation becomes uncertain when this happens.

SUMMARY OF THE INVENTION

It is one object of the present invention to provide an improved head tending system for an ink jet printer. It is another object of the present invention to provide a means for positively seating the end of an air supply line into the vent hole of a print head with repeated reliability. It is a further object of the invention to maintain the pressure of the vent hole at a substantially constant level. It is yet another object of the present invention to provide a means for cleaning the face of a print head with a relatively simple cleaning mechanism.

These and other objects of the invention are met by a print head tending system such as described in detail below. The disclosed head tending system includes swivel means for allowing the end of an air supply line to swivel or gimbal about its longitudinal axis into positive engagement with the vent hole of a print head.

A bleed hole is bored into the air line near the end of the line which engages the vent hole. Air escaping through the bleed hole helps to normalize the vent hole pressure relative to the ambient pressure.

The disclosed head tending system is further provided with a wiping cloth supply means for supplying a ribbon of ink-absorbing cloth or fabric. The ribbon is maneuvered in a simple way to wipe clean a printing face of the print head. A contoured wiping member is provided for controlling the movement of the wiping cloth. The wiping member is movably disposed such that differently contoured portions of its surface can be brought into facing relation with the printing face of the print head. A first surface portion of the wiping member is contoured to be spaced apart from the printing face and a second surface portion is contoured to press against the printing face with a wiping motion as the wiping member is moved. The ribbon of ink-absorbing cloth is interposed between the wiping member and the print head.

DETAILED DESCRIPTION OF THE PREFERRED EMBODIMENT

As described above, the positional deviations of each structural component in a printer can add up to create a total variation or tolerance "build-up" that makes it difficult to assure reliable alignment between all moving parts on a mass production basis. The present invention overcomes this problem by providing a head tending system which couples with the moveable print head of a printer in a self-aligning and relatively uncomplicated manner.

The embodiment described below represents the best presently contemplated mode for carrying out the invention. It is to be understood that the description of this preferred embodiment is not intended to be taken in a limiting sense and that the scope of the invention is best defined by the appended claims.

Figure 1:
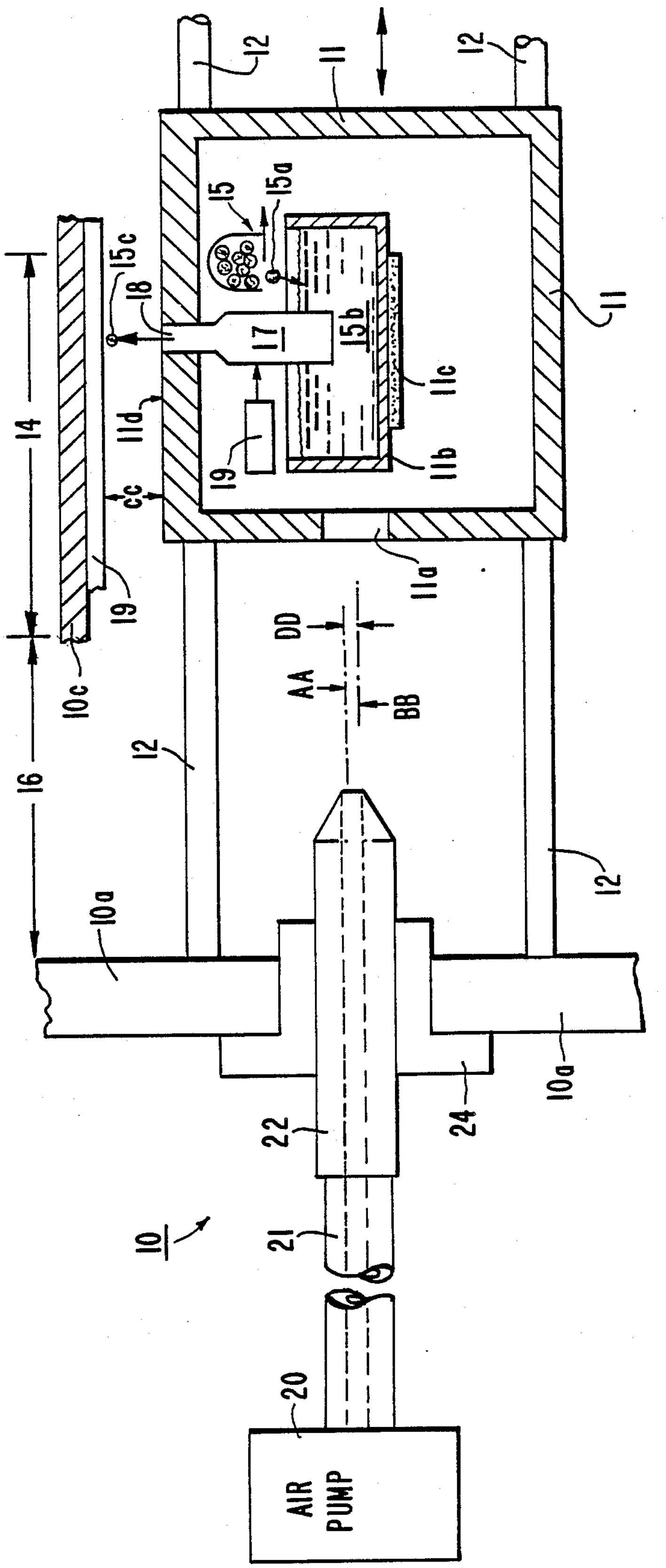
FIG. 1. (PRIOR ART)
FIG. 1 is a schematic diagram showing a portion of a previously known hot melt ink printer.
Figure 2A:
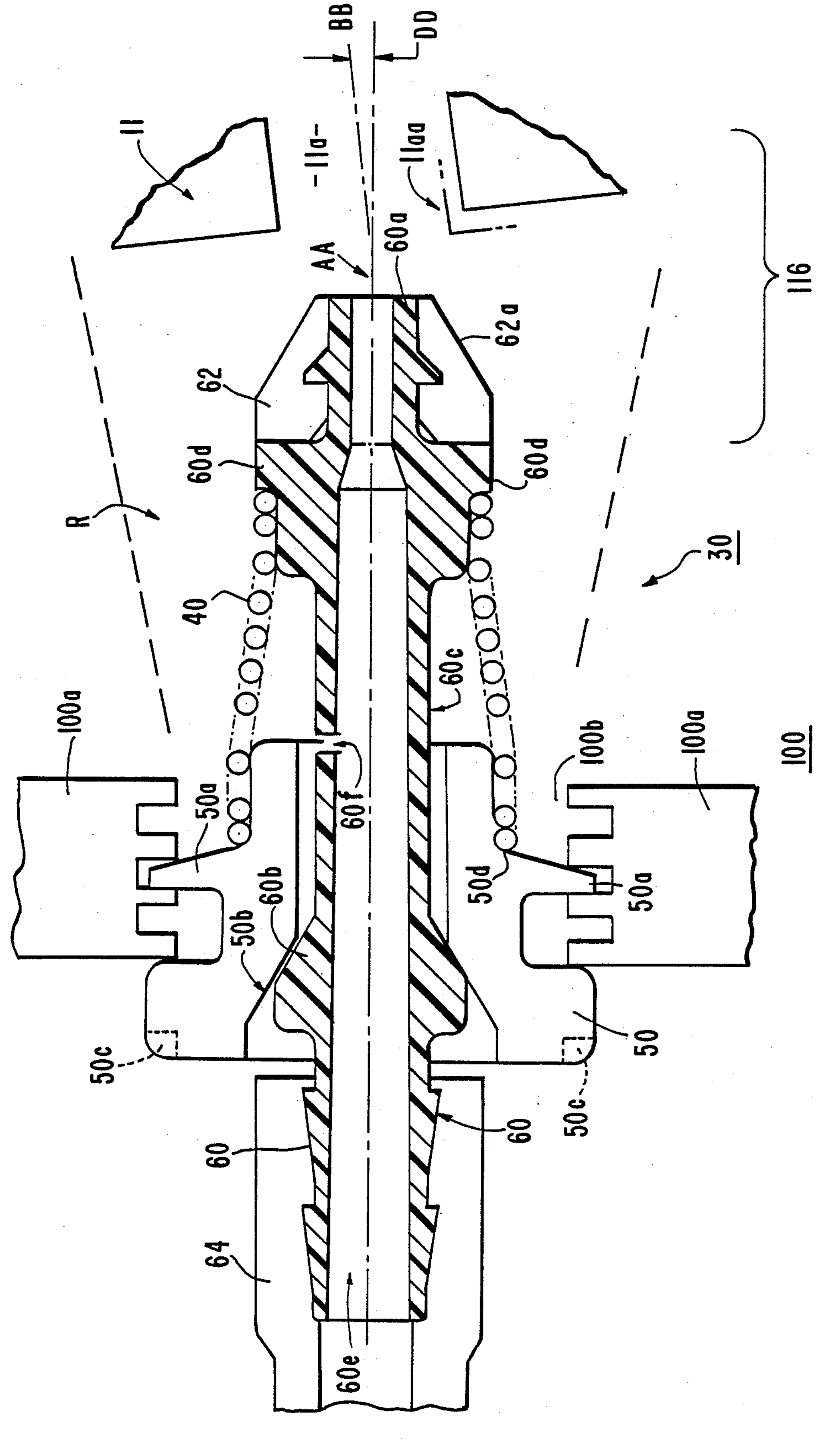
FIGS. 2A and 2B are respective cross sectional views of a self-aligning purge nozzle in accordance with a preferred embodiment of the present invention before and after engagement with a print head.

FIG. 2A is a cross sectional view showing part of a head maintenance area 116 within a printer 100 that is constructed in accordance with one embodiment of the present invention. A portion of a print head 11 including a vent hole 11*a* is shown to be grossly misaligned with respect to a purge nozzle subassembly 30. An axis AA of the nozzle subassembly 30 is illustrated (for the purpose of explaining the invention) to be at a substantially different angle from a corresponding axis, BB, of the vent hole 11*a*. It the vent hole 11*a* and subassembly 30 were allowed to mate while remaining at this angle, a substantial pressure leak may develop. The subassembly 30 however includes a swiveling portion that can compensate for the misalignment. The swiveling portion will be described within the course of explaining the purge nozzle subassembly 30 as a whole. A ring-like nozzle holder/guide 50 of the subassembly is screwed into a frame portion 100*a* of the printer 100. The exterior of the holder has a pair of threading tabs 50*a* which mate with a threaded hole 100*b* provided in the frame portion 100*a*. The holder 50 further has an inwardly tapered aligning portion 50*b* which is shaped to receive a cone-shaped back portion 60*b* of an elongated nozzle piece 60. A pair of tooling slots 50*c* are formed in a screw-head like portion of the holder. The slots 50*c* are adapted for coupling with a screw driver-like tool that is used during manufacture. Although shown as one piece, the holder 50 is preferably formed of two pieces, 50*g* and 50*h* (FIG. 3B), that are integrally molded and joined with a connecting hinge member 50*i*. The two pieces, 50*g* and 50*h* are united so as to surround an elongated shank portion 60*c* of the nozzle piece. Both the nozzle piece 60 and holder/guide 50 are preferably molded of a hard plastic such as nylon-6/6 (heat stabilized). The outer diameter of the shank portion 60*c* is substantially smaller than the inner diameter of the ring-like holder 50 so that the nozzle piece 60 can reciprocate through the central hole of the holder 50 in the direction of the longitudinal axis AA of the nozzle piece, and furthermore so that a front end 60*a* of the nozzle piece can be swiveled or gimballed within a cone shaped region R. The region R encompasses a predetermined range of positions and angles that may be taken by the vent hole 11*a* when engaging with the nozzle subassembly 30.

A helical spring 40 urges the nozzle piece 60 forward to initially seat the cone-shaped back portion 60*b* in a nominal or initial seating position against the aligning portion 50*b* of the holder 50. The front end 60*a* of the nozzle piece is thereby positioned at a predetermined nominal location and angle prior to being engaged by the print head 11. A first flange 50*d* is provided at the front of the holder 50 and an opposed second flange 60*d* is provided near the front portion 60*a* of the nozzle piece for retaining the spring 40 between the holder and the nozzle piece. The outer diameters of the spring 40, first and second flanges, 50*d* and 60*d*, are made smaller than the inside diameter of the threaded hole 100*b* so that the nozzle subassembly 30 comprising the nozzle piece 60, the spring 40 and holder 50 can be fitted into the threaded hole 100*b*.

A V-tipped nipple 62, preferably made of a relatively slippery and pliable material such as silicone rubber, rests against an opposite side of the second flange 60*d*. The material of the nipple 62 should be selected to enable the nipple to easily slip or slide on outskirt portions 11*a* of the print head immediately surrounding the vent hole 11*a*. This allows the front end 60*a* to slidably move along the outskirt portions 11*a* of the print head so that the nozzle piece 60 can gimbal into a sealable orientation with the vent hole 11*a*.

A tube 64, made of a flexible material that will not substantially interfere with the motion of the nozzle piece (e.g. thin polyethylene), is slipped over a barbed back end 60*c* of the nozzle piece to supply air into a through hole 60*e* passing longitudinally through the nozzle piece. A small bleed hole 60*f* passes through the shank portion to couple the through hole 60*e* to the exterior of the nozzle piece 60.

When the print head 11 initially engages with a V-tipped front portion 62*a* of the nipple 62, there may exist a certain positional deviation DD between the central longitudinal axis AA of the nozzle piece 60 and the corresponding central axis BB of the vent hole 11*a*. There can also be an angular misalignment, as shown, between the initial orientation of the two axes, AA and BB. However, as the print head moves against the tapered end (V-tipped end) 62*a* of the nipple, the back portion 60*b* of the nozzle piece is urged out of its initial seating position within the holder 50. The nozzle piece 60 is then essentially suspended in a gimbal-like manner against the spring 40 and is free to "float" into a self-aligned orientation with the print head 11.

Figure 2B:
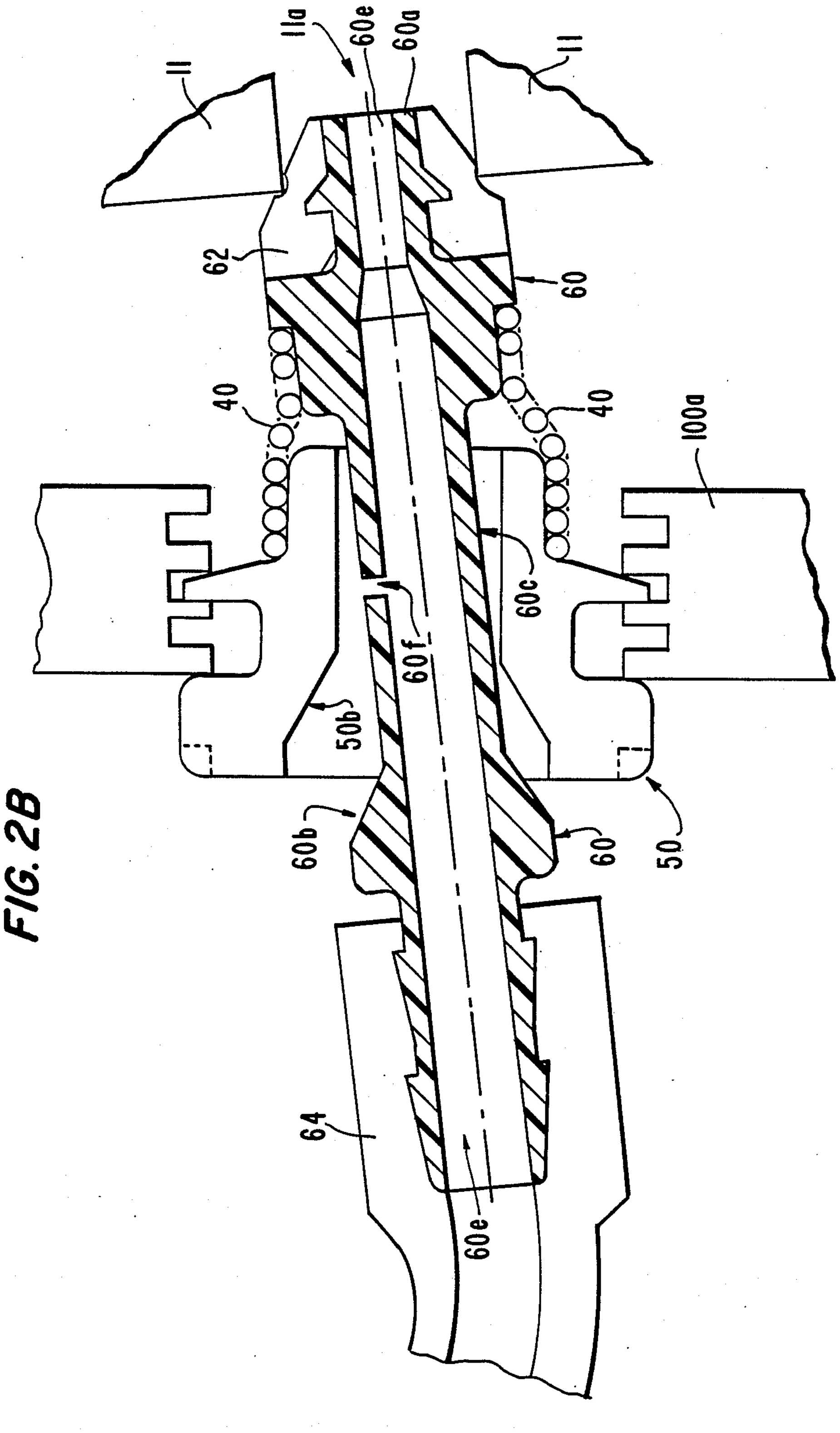

Referring to FIG. 2B, it will be apparent that once the back portion 60*b* of the nozzle piece is pushed out of its initial seating position in the holder 50, the nozzle piece 60 can float (move about) within the substantially wider confines of the inside diameter of the holder 50 so that the central axis AA of the nozzle piece 60 can align with the central axis BB of the print head vent hole 11*a*. The spring 40 urges the nozzle piece 60 to gimbal about until its front end 60*a* positively engages the vent hole 11*a*. The slippery material of the nipple 62 lets the front portion of the nozzle piece slide on the material of the print head surface until the nozzle piece 60 aligns itself into a minimal energy position (i.e. at which the potential energy of the spring 40 is minimized). As the force between the print head and nozzle piece increases, the nipple material deforms to the shape of the vent hole so that the space around the vent hole becomes substantially air tight.

The swivelling action of the nozzle subassembly 30 eases the requirements for precise positioning of the nozzle piece 60 at the time of manufacture. Tolerance build up is no longer a critical problem because a sealable alignment between the nozzle piece and the vent hole can be made to occur with repeatable reliability.

After engaging with the nozzle subassembly 30, the vent hole 11*a* should preferably be pressurized to and held at a substantially constant pressure level during purging so that the flow rate of the expelled ink can be determined and the volume of expelled ink calculated therefrom. The preferred method for controlling air pressure at the vent hole 11*a* will now be described by referring to the bleed hole 60*f* and through hole 60*e* of the nozzle piece shown in FIGS. 2A and 2B. The flexible air tube 64 receives air from a volumetric type of air pump (not shown in FIG. 2A). Such a pump moves a predetermined volume of air into the tube at a set flow rate in order to build up pressure inside the print head 11. It the interior of the print head were to be completely sealed, the air pressure could continue to increase until it exceeds desired operating levels.

Under normal conditions the one or more orifices 18 of the print head provide an escape path for this pumped air. The diameter of each orifice is extremely small, on the order of 0.001 inch. The print head typically has eight or more such orifices (preferably 24–32 orifices) so that a plurality of escape holes are provided for the pumped air. Some of these orifices can become clogged with dirt or particulate matter. The number of orifices 18 that are in a clogged or partially obstructed condition is usually unknown at the time a purging operation is initiated. As such, the pressure in the print head 11 can vary by a substantial amount depending on how many of the orifices are open and how many are clogged when the air pump is turned on.

The bleed hole 60*f* is dimensioned so that a certain amount of the pumped air can always escape through the bleed hole to cause the pressure at the vent hole 11*a* to be less sensitive to the number of orifices that are opened or clogged. In the preferred embodiment of FIG. 2A, the bleed hole 60*f* is set to have an inside diameter of 0.020 inch in correspondence to the 0.001 inch diameter of each of thirty two orifices provided in the print head 11. The through hole 60*e* has a diameter of about 0.090 inch. The bleed hole is positioned approximately 0.55 inch from the front end of the nozzle piece 60. Even if some orifices remain clogged during a purging operation, the purging pressure will not vary by a substantial amount because of the alternate passageway provided through the bleed hole 60*f*. The unclogged orifices can therefore be expected to expel ink under a substantially constant purging pressure. The amount of ink expelled from the print head reservoir 11*b* can consequently be determined with some accuracy once the number of clogged orifices is ascertained. The printer 100 can accordingly be designed to include a purge control means which detects the number of clogged orifices at the beginning of a purge cycle and assures that neither too much nor too little ink, is expelled during a purge operation.

Figure 3A:
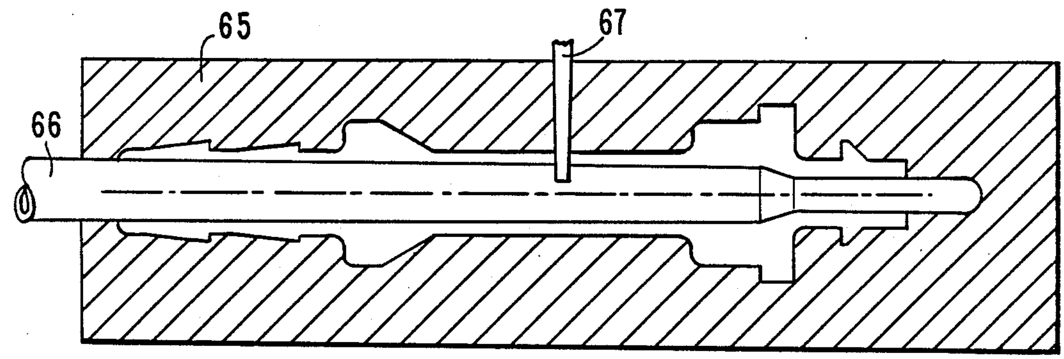
FIGS. 3A and 3B respectively depict preferred methods for manufacturing the nozzle piece and holder/-guide piece of FIG. 2A.
Figure 3B:
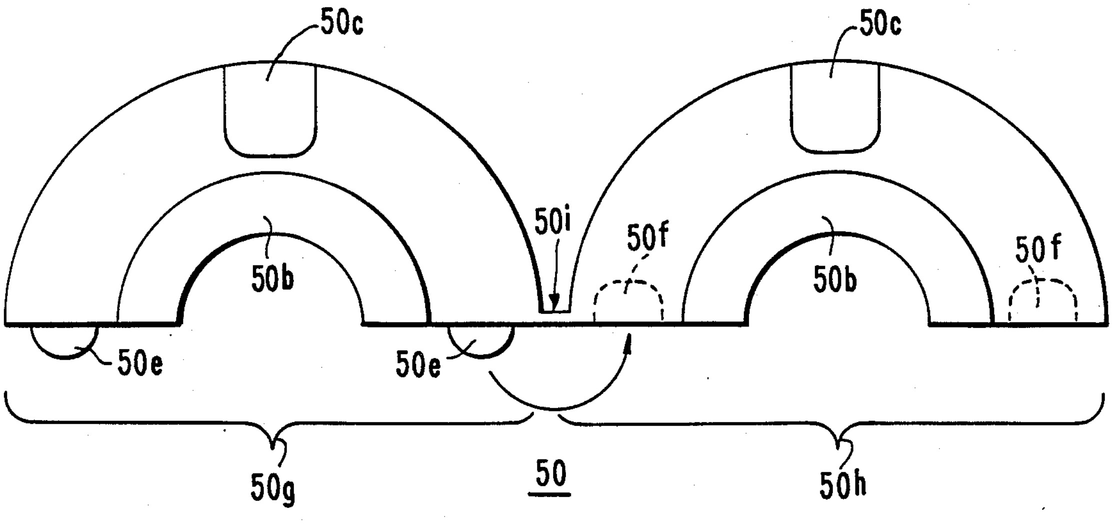

One object of the present invention is to manufacture the nozzle subassembly 30 with a minimal number of parts and at low cost. This objective can be met by integrally molding the holder-guide 50 as one unit and doing the same for the nozzle piece 60. FIG. 3B shows how the holder/guide 50 can be injection molded as two halves, 50*g* and 50*h*, that are integrally joined by a connecting hinge member 50*i*. Joining tabs 50*e* are formed on one half 50*g* and adapted to fit into joining holes 50*f* formed in the mating half 50*h*. During assembly, the spring 40 is compressed against the second flange 60*d* of the nozzle piece, the two halves, 50*g* and 50*h*, are united to complete the holder about the shank portion 60*c* an the spring is released to surround the shoulder of the first flange 50*d* on the holder. The holder 50 is then held with a slot fitting tool (fits into tool slots 50*c*) and screwed into the threaded hole 100*b*. Thereafter, the subassembly 30 is retained in the printer frame 100*a* as shown in FIG. 2A. Manufacturing cost is reduced by minimizing the parts count and the number of steps required for assembly FIG. 3A shows a cross sectional view of a mold form 65 that can be used to manufacture the nozzle piece 60 quickly and with a minimal number of parts. A tapered first pin 66 is positioned in the mold 65 to define the through hole 60*e*. A tapered second pin 67 is inserted at right angles to the first pin to define the bleed hole 60*f*. The tapering on the pins, 66 and 67, allows them to be easily removed after plastic is injected into the mold.

Figure 4:
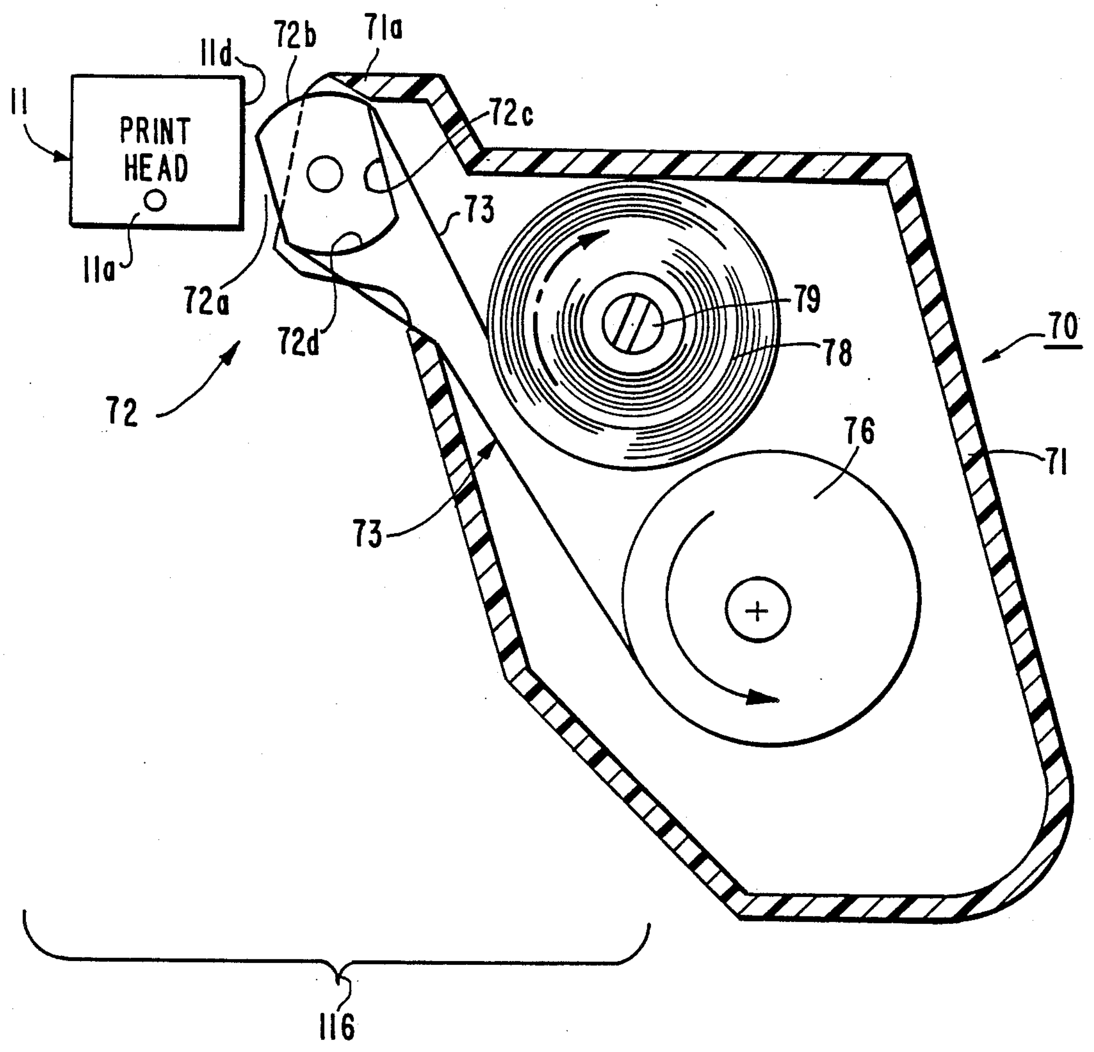
FIG. 4 is a side cross sectional view of a wiper mechanism adapted for wiping the face of a print head in accordance with a preferred embodiment of the present invention.

Once ink has been purged from the orifices of the print head, the expelled ink should be cleaned away. FIG. 4 shows a side view of the print head 11, while it is positioned in the head maintenance area 116 of the printer 100. The printer 100 is provided with a cartridge receiving section within the maintenance area. A wiping cloth supply cartridge 70, which includes a disposable wiping cloth material 73, is removably inserted into the cartridge receiving area. The cartridge 70 is positioned to align a specially contoured wiping member or roller 72 in facing relation with the printing face 11*d* of the print head 11. The wiping roller 72 is movably (rotatably) disposed in a housing 71 of the cartridge 70 such that when the roller 72 is turned, portions of a contoured exterior of the roller move toward and away from the printing face 11*d* of the print head. The exterior surface of the wiping roller 72 includes a first surface portion 72*a* that is contoured to be spaced apart from the printing face 11*d* as the wiping roller turns. A second surface portion 72*b* is contoured to press against the printing face 11*d* when the wiping roller is rotated about its rotational axis. Preferably, the wiping roller 72 is made of a compressible material such as a plastic foam (e.g. a urethane foam with a 20 Durameter hardness). When the wiping roller is pressed against the printing face, the foam should preferably deform to provide a minimum foot print covering all the orifices of the print head that need to be cleaned.

The wiping cloth 73 is a ribbon made of an ink absorbing material such as a lint free cotton. A portion of the ribbon 73 is interposed between the print head and the exterior surface of the wiping roller such that the wiping cloth 73 will directly engage the printing face 11*d* of the print head with a wiping motion when the wiping roller 72 is rotated. The lint free feature of the cloth 73 is important. It is not desirable to introduce loose debris such as lint onto the printing face 11*d* because such debris can later clog the orifices of the print head. The edges of the wiping cloth ribbon 73 are preferably sealed with a plastic material to keep threads in the fabric from fraying. A take up spool 76 is provided within the cartridge 70 to rotatably collect used portions of the fabric 73 in the direction shown while a supply roller 78 supplies fresh cloth to the wiping roller 72 by rotating in the opposite direction about a forked shaft 79. The forked portion of the shaft 79 is compressed slightly into a bushing of the cartridge (not shown) to create a small amount of rotational friction. The purpose of this will be explained shortly.

It will be apparent from FIG. 4 that the print head 11 will be able to move freely away from the head maintenance area 116 when the first surface portion 72*a* of the wiping roller is in facing relation with the printing face 11*d*. The wiping roller 72 is preferably contoured to have a plurality of such head engaging surfaces, 72*b*, 72*d* and also a plurality of head nonengaging surfaces 72*a*, 72*c*, arranged one after the other as shown in a back-to-back "double D" configuration so that more than one separate wiping operation can take place during a full rotation of the wiping roller. A plurality of desired functions are provided merely by rotating the wiping roller. Rotation of the wiping roller 72 allows the wiping cloth 73 to advance, brings a fresh portion of the cloth into wiping engagement with the print head, moves portions of the cloth that have already absorbed a predetermined volume of ink away from the print head, and then separates the wiping cloth from the print head at the end of a wiping operation so that the print head 11 can be freely returned, to a printing area (14) of the printer.

For absorbing an ink volume of approximately 0.12 cc it was found that good results can be obtained by dragging a 1.6 inch length of fresh cotton fabric (lint free) across the printing face at a rate of 0.13 inch per second. The larger diameter of the wiping roller 72 (between surface portions 72*b* and 72*d*) is set to approximately 22 millimeters so that the desired drag rate will be obtained by rotating the wiping roller 72 one full rotation in a 12 second period.

Figure 5A:
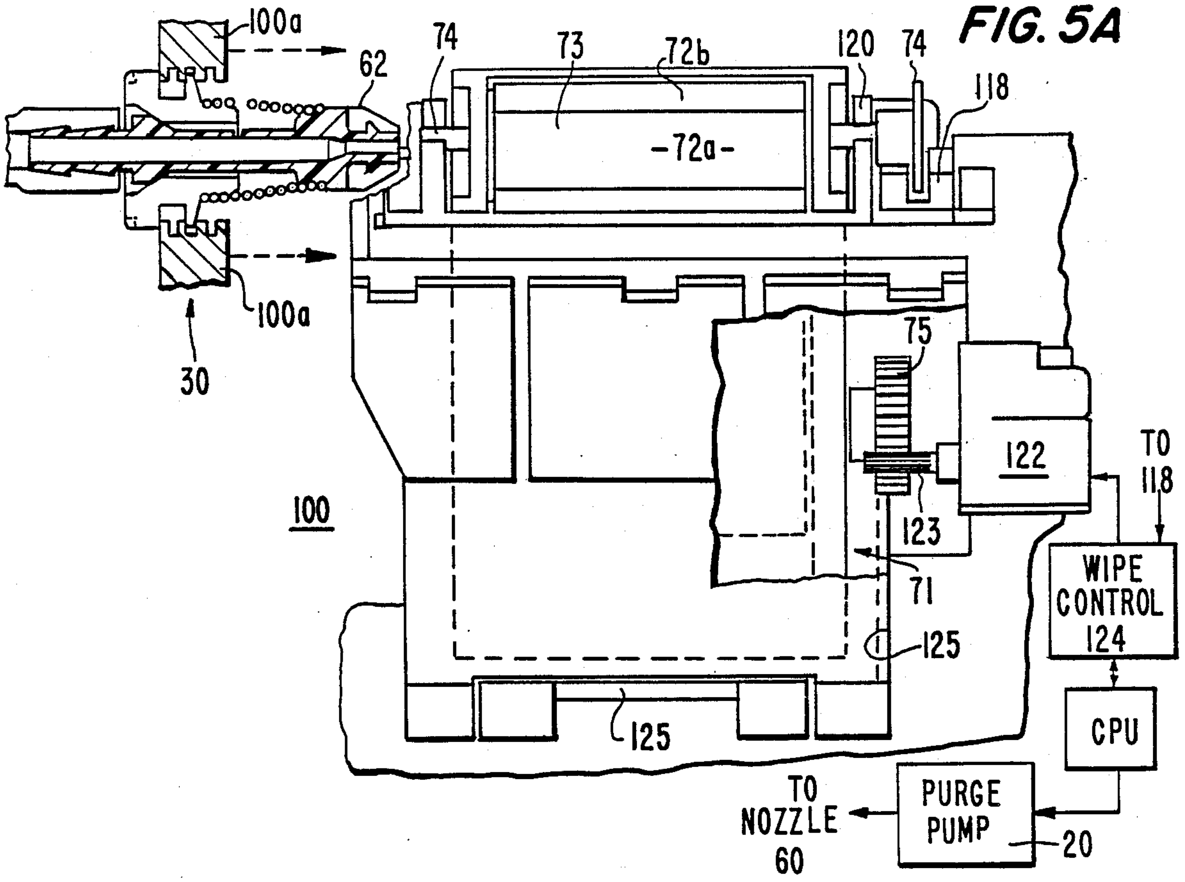
FIG. 5A is a front sectional view of a printer including the purge nozzle of FIG. 2A and wiper mechanism of FIG. 4.
Figure 5B:
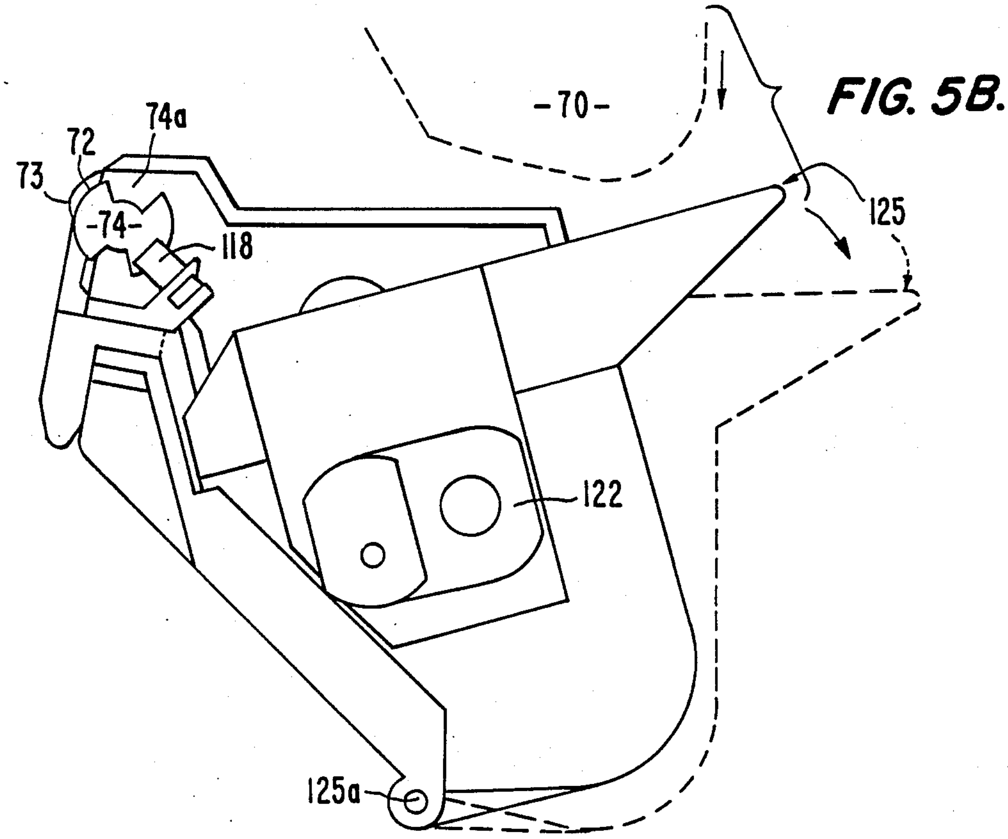
FIG. 5B is a side elevational view of the wiper mechanism of FIG. 5A.

The orientation of the head engaging/nonengaging surfaces 72*a*–72*d* of the wiping roller relative to the printing face 11*id* of the print head can be detected by an angular position detecting means. FIGS. 5A and 5B show a position indicating wheel 74 that is connected to the wiping roller 72 and projected out of the cartridge housing 71 to allow such detection. In the preferred embodiment, the indicating wheel 74 has a pair of substantially V-shaped slits 74*a* aligned in a predetermined angular relation to the nonengaging surfaces 72*a*, 72*c* of the wiping roller. An optical sensor 118 disposed in the printer 100 detects the edges of the V-slits. Opposed edges of each V-slit generate a respective rising and falling edge in the intensity of a light beam passing through the sensor 118. Two V-slits can be used to precisely locate four positions within a full rotation of the wiping roller 72.

The optical detector 118 may also be used to detect proper insertion of the removable cartridge 70 into a spring clip 120 of the cartridge receiving area. The spring clip 120 clamps about a shaft 74*b* of the indicating wheel 74. If the cartridge is not properly seated in the spring clip 120, the V-slits will not interrupt the light beam of the optical sensor 118 over a predetermined rotational distance while a shortly-to-be-described motor is actuated to turn the wiping roller 72. An alarm can be sounded or otherwise activated to indicate improper insertion of the cartridge 70.

A motor 122 having a pinion gear 123 is disposed in the cartridge receiving area of the printer 100. The pinion gear 123 is disposed to engage a drive gear 75 that is coupled to the take up roller 76 of the cartridge 70. The motor 122 is controlled by a wiping control unit 124 which in turn is responsive to the detector 118 and a central processing unit CPU. The pinion gear 123 is preferably rotated downwardly against the teeth of the drive gear 75 so that the cartridge 70 is urged downwardly into a desired seating position in a pivoting cartridge bucket 125. Although not shown in FIG. 4, the pinion gear 123 effectively engages with the left side of the take up reel 76 as shown in FIG. 4, to create the downward force. The cartridge bucket 125 is attached so that it can pivot on a hinge 125*a* to allow vertical loading and removal of the cartridge 70 as shown by the phantom lines of FIG. 5B.

The wiping cloth 73 is supplied in a pre-rolled fresh form on the supply roller 78. The wiping roller 72 is forced to rotate as a result of capstan action between itself and the wiping cloth when the wiping cloth 73 is reeled in onto the take up spool 76. The supply roller 78 has a forked shaft 79 (FIG. 4) which generates a small amount of rotational friction against the housing 71 and thereby creates a certain amount of back tension in the cloth 73. Additional back tension is generated by a scraping portion 71*a* of the cartridge housing The scraping portion 71*a* presses the wiping cloth 73 against the wiping roller 72 in order to assure that the wiping roller will be gripped by the cloth 73 as the cloth is taken up on the take-up spool 76.

The rotating action of the take-up spool 76 provides multiple functions. It moves a used portion of the wiping cloth 73 away from the printing face of the print head, it moves a fresh portion into contact with the printing face, it forces the wiping roller 72 to rotate, and it causes the wiping cloth to move through the intersection of the print head and the wiping roller so as to travel across the printing face with a downward wiping action. The wiping action enhances the ability of the cloth to absorb ink being purged from the orifices and to remove dirt that may have accumulated on the printing face. Further rotation of the take-up spool 76 turns the wiping roller 72 so as to disengage the wiping cloth from the printing face. The print head is then free to return to the printing area of the printer. Precise alignment of the removable cartridge 70 with the print head 11 is not required because the compressible material of the wiping roller compensates for positional deviations.

FIG. 5A shows how the described printer 100 coordinates the operations of the above described purge nozzle subassembly 30 and wiping system which intersect with the print head in the maintenance area. A CPU in the printer 100 controls the actions of the motor 122 and the air pump 20 supplying air to the purge nozzle subassembly 30 so that the two subsystems can operate in unison. The wiping action of the cartridge 70 is initiated at the same time that the purge pump 20 is activated. The print head 11 is preferably not returned to the printing area of the printer until the CPU senses the completion of a wiping operation. It will be readily appreciated that the combination of the purge nozzle and wiping system in the head maintenance area 116, as shown, permits a repeatably reliable purging and cleaning operation without need for a complicated aligning mechanism.

Those skilled in the art will appreciate that numerous variations to the above described invention are possible, with some alternate embodiments resulting from routine design modifications and others being derived from a more detailed study of the disclosed invention. As such, the scope of the present invention should not be limited to the particular embodiment described above but should rather be defined by the appended claims and equivalents thereof.

What is claimed is:

1. A head tending system for maintaining a print head that is movable into a maintenance area of a printer, wherein the print head has vent hole, comprising:
a movable nozzle piece disposed in the maintenance area of the printer;
holding means for holding the movable nozzle piece in the maintenance area;
initial alignment means for aligning the nozzle piece in an initial position at which the nozzle piece can enter the vent hole when the movable print head is moved into the maintenance area; and
swivel means for allowing the nozzle piece to swivel relative to its initial position so that the nozzle piece can move to be positively seated in the vent hole of the print head.

2. A head tending system according to claim 1 further comprising a spring means for resiliently urging the nozzle piece into the initial position and also urging the nozzle piece into positive seating in the vent hole.

3. A head tending system according to claim 2 wherein the swivel means includes a cone-shaped portion attached to the nozzle piece, the initial alignment means adapted to engage the cone-shaped portion and the nozzle piece includes an elongated shank portion extending from the cone-shaped portion, and further wherein the nozzle piece has opposed front and back ends between which there is defined a through-hole passing through the nozzle piece to provide an air passageway communicating between the back end of the nozzle piece and the front end of the nozzle piece.

4. A head tending system according to claim 3 wherein a portion of the print head immediately surrounding the vent hole defines an outskirt portion and wherein a compliant nipple, made of a material which is adapted to slide on the outskirt portion of the print head, is provided at the front end of the nozzle piece such that the nozzle piece can swivel when the nipple is pressed against the outskirt portion.

5. A head tending system according to claim 3 wherein a bleed hole is defined in the nozzle piece, communicating between the through-hole and an exterior surface of the nozzle piece.

6. A head tending system for a movable print head that is movable into a maintenance area of a printer, the print head having a printing face that is to be cleaned, comprising
a cleaning cartridge, adapted for removable insertion into the maintenance area of the printer, wherein the cartridge includes:
a wiping roller having an exterior surface that can be rotated about a rotational axis to bring portions thereof into facing relation with the printing face of the print head, the exterior surface of the wiping roller including a first portion which is contoured so as to be spaced apart from the printing face of the print head when rotated into facing relation with the printing face, and a second portion which is contoured so as to press against the printing face of the print head when rotated into facing relation with the printing face; and
a wiping fabric disposed on the exterior surface of the wiping roller for wiping the printing face of the print head.

7. A head tending system according to claim 6 wherein the cleaning cartridge further includes a position sensing means for sensing the rotational position of the wiping roller.

8. A head tending system according to claim 6 wherein the wiping fabric includes cotton.

9. A head tending system for a movable print head that is movable into a maintenance area of a printer, wherein the printer head has a vent that is to be pressurized and a printing face that is to be wiped clean, comprising:
a movable nozzle piece disposed in the maintenance area of the printer;
holding means for holding the movable nozzle piece in the maintenance area;
initial alignment means for aligning the nozzle piece in an initial position at which the nozzle piece can enter the vent hole when the movable print head is moved into the maintenance area;
float means for allowing the nozzle piece to float relative to its initial position so that the nozzle piece can move to positively seat itself in the vent hole of the print head; and
a cleaning cartridge receiving means for receiving and actuating a removable cartridge, wherein the cartridge includes: (a) a wiping member having a contoured exterior surface that can be actuated by the cartridge receiving means to bring portions of the exterior surface into facing relation with the printing face of the print head, at least one portion of the exterior surface being contoured to press against the printing face and a second portion being contoured to not press against the printing face; and (b) a wiping fabric, disposed on the exterior surface of the wiping member so as to be interposed between the wiping member and printing face, for wiping the printing face of the print head.

10. A cleaning cartridge for cleaning a printing face of a print head, comprising,
a housing;
a contoured wiping member movably disposed in the housing, wherein the wiping member has first and second surface portions each disposed to be moved into facing relation with the printing face, the first surface portion being contoured to be spaced away from the printing face when moved to face it and the second surface portion being contoured to press against the printing face when moved to face it; and
a head cleaning fabric disposed within the housing, wherein a portion of the cleaning fabric is positioned to be interposed between the printing face of the print head and the first and second surface portions of the wiping member.

11. A cartridge according to claim 10 wherein the cleaning fabric includes a lint free cotton.

12. A cartridge according to claim 10 further comprising a position sensing means for sensing the positions of the first and second surface portions.

13. A cartridge according to claim 10 wherein the wiping member includes a compressible material.

14. An ink jet printer having a print head that is movable between a printing area and a maintenance area of the printer, a portion of the print head having a vent hole defined therein, comprising:
a frame;
a nozzle piece, resiliently attached to the frame such that the nozzle piece can be displaced along plural axes in relation to the frame, the nozzle piece including a front portion that is engageable with the vent hole portion of the print head;

a cartridge receiving means for receiving a removable cleaning cartridge which includes an advanceable cleaning tape; and a tape advancing means, engageable with the cleaning cartridge, for advancing the cleaning tape.

15. The printer of claim 14 wherein the nozzle piece and the cartridge receiving means are positioned within the maintenance area of the printer such that the print head can be moved to operatively engage with the nozzle piece and the cleaning tape of the cartridge at substantially the same time.

16. A printer according to claim 15 further comprising:

an air pump coupled to the nozzle piece, and a control means, operatively coupled to the air pump and the tape advancing means, for actuating the air pump and tape advancing means when the print head is moved into the maintenance area.

17. A method for aligning a purge nozzle having a print head engaging portion with a vent hole of an ink jet print head comprising:

attaching the purge nozzle and the print head to the frame of a printer, wherein the print head is attached to reciprocate along a lateral axis, the purge nozzle is attached to reciprocate along an axis parallel to the lateral axis, and the purger nozzle is further attached to swivel about the lateral axis;

providing at a print head engaging portion of the purge nozzle a slippery material that can slip on the material of the print head surrounding the vent hole; and moving the print head against the print head engaging portion of the purge nozzle in order to cause the purge nozzle to enter the vent hole and to swivel to a position in which the purge nozzle achieves a sealed coupling with the vent hole.

18. A method for cleaning a printing face of an ink jet printer comprising:

providing a wiping roller that is rotatable about a rotational axis, where the wiping roller has a first surface portion disposed a first distance away from the rotational axis and a second surface portion disposed a second distance, different from the first distance, away from the rotational axis;

locating a wiping cloth to be interposed between the printing face of the ink jet printer and the exterior surface of the wiping roller; and rotating the wiping roller.

19. A head cleaning device for cleaning a print head that is movable along a first path, comprising:

a wiping member having a contoured exterior surface which is movable along a second path intersecting the first path at an intersection region, wherein the exterior surface is made of a resilient material and has first and second contoured portions that are respectively contoured to be spaced apart from and to press against the print head when the print head is moved to the intersection region; and a tape, made of a flexible wiping fabric and having a portion thereof disposed on the exterior surface of the wiping member so as to be interposed between the wiping member and the print head for wipingly engaging with the print head when the second contoured portion moves through the intersection region, wherein the tape is movable along a third path passing through the intersection region.

20. A device according to claim 19 wherein the second path is a closed loop.

21. A device according to claim 19 further comprising friction means for frictionally engaging the tape against the wiping member such that the tape advances through the intersection region when the wiping member is moved.

22. A head tending system for maintenance of a print head that is movable into a maintenance area of a printer, the print head being provided with a vent hole having a central axis, said system comprising:

a nozzle piece defining an air flow passage and having an outlet end, said nozzle piece having a longitudinal axis on which said outlet end is centered; and support means supporting said nozzle piece in the maintenance area in an initial position which enables said outlet end to engage the vent hole when the print head is moved into the maintenance area, said support means comprising a flexible support member which supports said nozzle piece in a manner to permit said nozzle piece to de displaced both parallel and transversely to the longitudinal axis by engagement of the vent hole by said outlet end in a manner to coaxially align said nozzle piece longitudinal axis with the central axis of the vent hole.

23. A head tending system according to claim 6 wherein the wiping fabric is in the form of a tape; the system further comprises means coupled to the tape for advancing the tape, and the roller is mounted to be rotated by the advancing movement of the tape.

* * * * *